United States Patent
Sato et al.

(10) Patent No.: US 12,422,711 B2
(45) Date of Patent: Sep. 23, 2025

(54) DISPLAY APPARATUS

(71) Applicant: Panasonic Automotive Systems Co., Ltd., Kanagawa (JP)

(72) Inventors: Hiroaki Sato, Kanagawa (JP); Yasunobu Inaba, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 19/025,582

(22) Filed: Jan. 16, 2025

(65) Prior Publication Data

US 2025/0271698 A1    Aug. 28, 2025

(30) Foreign Application Priority Data

Feb. 22, 2024    (JP)  ................................. 2024-025076

(51) Int. Cl.
*G02F 1/1335*     (2006.01)
*G02F 1/13363*    (2006.01)

(52) U.S. Cl.
CPC .. *G02F 1/133557* (2021.01); *G02F 1/133528* (2013.01); *G02F 1/13363* (2013.01)

(58) Field of Classification Search
CPC ......... G02F 1/133557; G02F 1/133528; G02F 1/13363
See application file for complete search history.

(56) References Cited

U.S. PATENT DOCUMENTS

| | | | | |
|---|---|---|---|---|
| RE36,654 E | * | 4/2000 | Conner | G06F 1/1601 349/97 |
| 7,633,567 B2 | * | 12/2009 | Yamada | G02F 1/13471 349/1 |
| 2006/0268208 A1 | * | 11/2006 | Murakami | G02F 1/133528 349/117 |
| 2007/0263140 A1 | * | 11/2007 | Hinata | G02F 1/133308 349/96 |
| 2016/0011429 A1 | * | 1/2016 | Vdovin | G02B 30/31 359/462 |
| 2022/0382109 A1 | * | 12/2022 | Haruyama | G02F 1/133526 |
| 2023/0367156 A1 | * | 11/2023 | Kawahira | G02F 1/13363 |

FOREIGN PATENT DOCUMENTS

JP     4418483     2/2010

\* cited by examiner

*Primary Examiner* — Bryon T Gyllstrom
(74) *Attorney, Agent, or Firm* — GREENBLUM & BERNSTEIN, P.L.C.

(57) ABSTRACT

A display apparatus includes an optical member with translucency, a transmissive member, an electro-optical member, and a housing. The optical member includes a front surface corresponding to an observation side and a back surface lying behind the front surface. The transmissive member is provided on a peripheral edge of the back surface of the optical member. The transmissive member has a transmittance of 5% or more. The electro-optical member is provided on a side of the back surface of the optical member. The electro-optical member has optical characteristics varying with applied voltage. The housing includes a protruding portion. The protruding portion covers an end portion of the electro-optical member and protrudes toward the back surface of the optical member. An end portion of the transmissive member is located between an end portion of the optical member and the protruding portion.

17 Claims, 6 Drawing Sheets

| Cr THICKNESS [nm] | 20 | 25 | 30 | 35 |
|---|---|---|---|---|
| TRANSMITTANCE [%] | 15.6 | 11.1 | 8.0 | 5.8 |

T1

| TRANSMITTANCE [%] | 5 | 10 | 15 | 20 |
|---|---|---|---|---|
| VISIBILITY OF STRUCTURES | ◎ | ◎ | ○ | ○ |
| VISIBILITY OF ELECTRO-OPTICAL MEMBER | ◎ | ◎ | ○ | △ |
| CONTOUR OF BOUNDARY | △ | ○ | ○ | ◎ |

T2

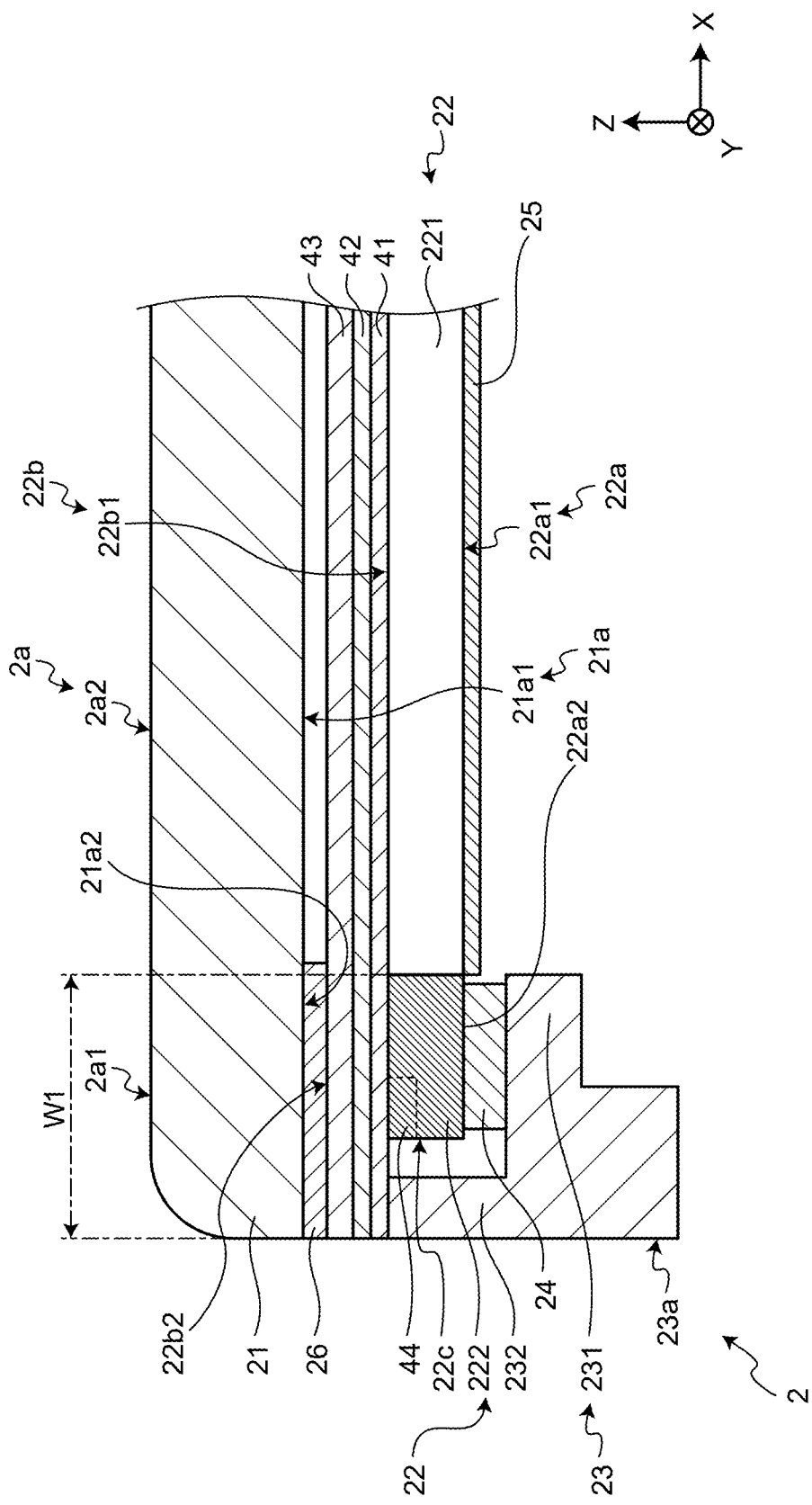

DISPLAY APPARATUS

CROSS-REFERENCE TO RELATED APPLICATIONS

This application is based upon and claims the benefit of priority from Japanese Patent Application No. 2024-025076, filed on Feb. 22, 2024, the entire contents of which are incorporated herein by reference.

FIELD

The present disclosure relates generally to a display apparatus.

BACKGROUND

A display apparatus such as an electronic mirror has a display region inside a frame region on a front surface.

In a display mode, the display apparatus displays an image in the display region on the front surface and, in the mirror mode, causes the display region on the front surface to function as a mirror (See, for example, a patent literature JP 4418483 B2).

From the viewpoint of appearance of the display apparatus, it is desired to reduce the contour existing at the boundary between the frame region and the display region on the front surface.

SUMMARY

A display apparatus according to one aspect of the present disclosure includes an optical member with translucency, a transmissive member, an electro-optical member, and a housing. The optical member includes a front surface corresponding to an observation side and a back surface lying behind the front surface. The transmissive member is provided on a peripheral edge of the back surface of the optical member. The transmissive member has a transmittance of 5% or more. The electro-optical member is provided on a side of the back surface of the optical member. The electro-optical member has optical characteristics varying with applied voltage. The housing includes a protruding portion. The protruding portion covers an end portion of the electro-optical member and protrudes toward the back surface of the optical member. An end portion of the transmissive member is located between an end portion of the optical member and the protruding portion.

BRIEF DESCRIPTION OF THE DRAWINGS

FIG. 8 is a cross-sectional view illustrating an example of a configuration of a display apparatus according to a second modification.

DETAILED DESCRIPTION

Hereinafter, an embodiment of a display apparatus according to the present disclosure will be described with reference to the drawings.

Embodiment

The display apparatus according to the embodiment is, for example, an electronic mirror. The display apparatus according to the embodiment has a frame region at an edge portion on a surface and a display region on the surface, but is devised for reducing the width of the contour existing at the boundary between the frame region and the display region.

Figure 1:
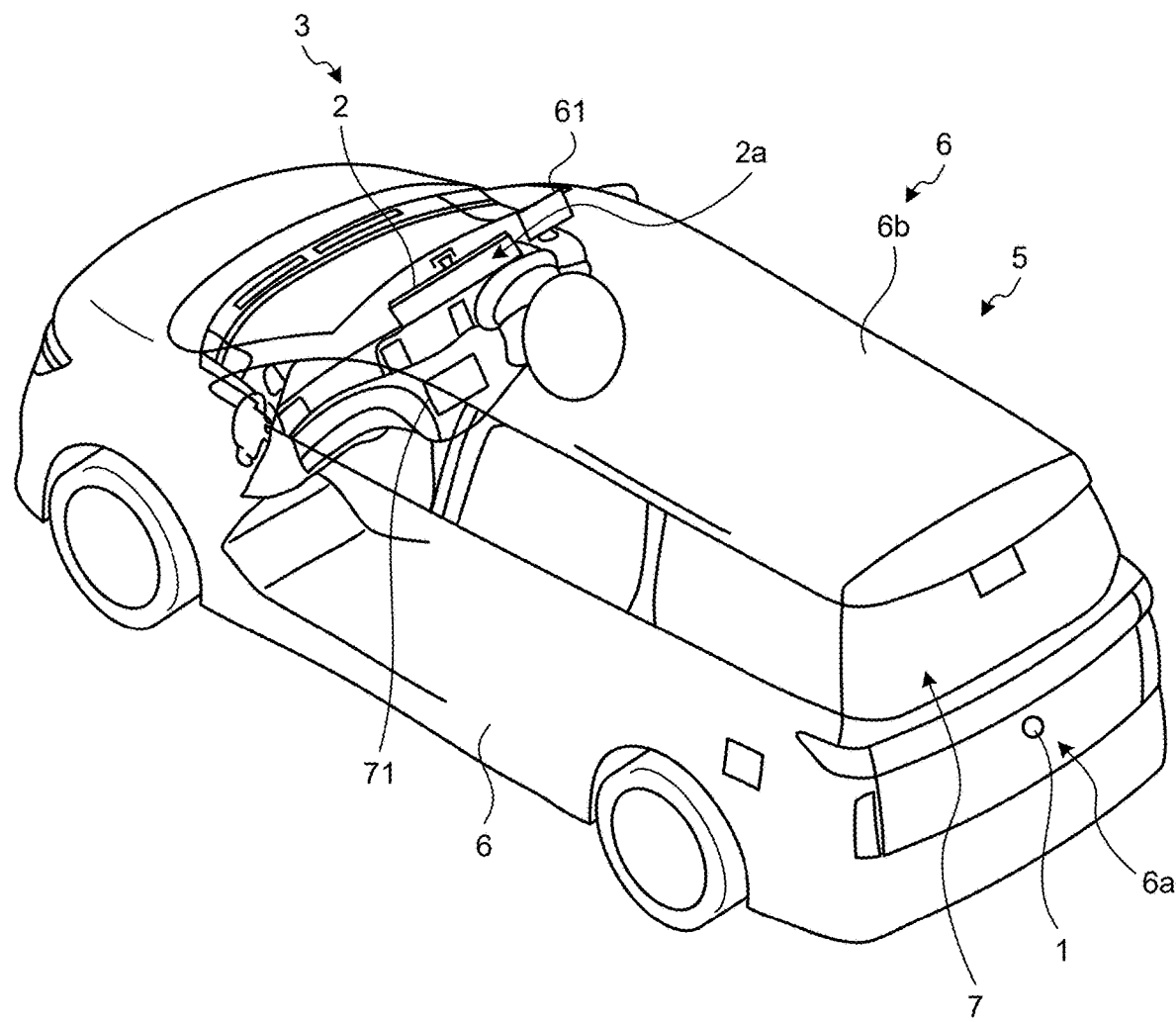
FIG. 1 is a schematic diagram illustrating an example of a vehicle on which an electronic mirror system including a display apparatus according to an embodiment is installed.

For example, an electronic mirror system 3 can be installed in a vehicle 5 as illustrated in FIG. 1. FIG. 1 is a schematic diagram illustrating an example of the vehicle 5 on which the electronic mirror system 3 according to the embodiment is installed. The electronic mirror system 3 includes an imaging apparatus 1 and a display apparatus 2.

The imaging apparatus 1 is an in-vehicle camera installed in the vehicle 5. The imaging apparatus 1 is installed outside or inside a vehicle body 6. The imaging apparatus 1 may be installed on the rear side of the vehicle body 6 to image the rear side of the vehicle 5. The imaging apparatus 1 may be installed near the door of the vehicle body 6 to image the side of the vehicle 5. The imaging apparatus 1 may be installed on the front side of the vehicle body 6 to image the front side of the vehicle 5.

The display apparatus 2 is disposed in a vehicle interior 7. The display apparatus 2 is, for example, an electronic mirror. The display apparatus 2 has a front surface 2a and can display an image acquired by the imaging apparatus 1 on the front surface 2a. The display apparatus 2 is configured to be switchable between a display mode and a mirror mode. The display mode is a mode in which the display apparatus 2 functions as a display that displays an image captured by the imaging apparatus 1. The mirror mode is a mode in which the display apparatus 2 functions as a mirror.

In a case where the display apparatus 2 is an electronic mirror for rear visual recognition, the display apparatus 2 may be installed in the form of a rearview mirror. In this case, the front surface 2a may face the vehicle interior 7, and the shape of the front surface 2a may be the shape of a mirror surface of the rearview mirror. In a case where the display apparatus 2 is an electronic mirror for side visual recognition, the display apparatus 2 may be installed in the form of a door mirror (for example, door mirror 61). In this case, the front surface 2a may face the rear side of the vehicle body 6, and the shape of the front surface 2a may be the shape of a mirror surface of the door mirror.

In a case where the display apparatus 2 is an electronic mirror for front visual recognition, the display apparatus 2 may be installed in the form of an in-vehicle display device (for example, display device 71). In this case, the front surface 2a may face the vehicle interior 7, and the shape of the front surface 2a may be the shape of the display unit of the display device.

In FIG. 1, the imaging apparatus 1 is installed at an end portion 6a on the rear side of the vehicle body 6, and the display apparatus 2 is applied to an electronic mirror for rear visual recognition. The electronic mirror for rear visual recognition is also called an electronic rearview mirror. The imaging apparatus 1 acquires an image behind the vehicle body. The display apparatus 2 can display an image of the rear side of the vehicle body captured by the imaging apparatus 1.

Figure 2:
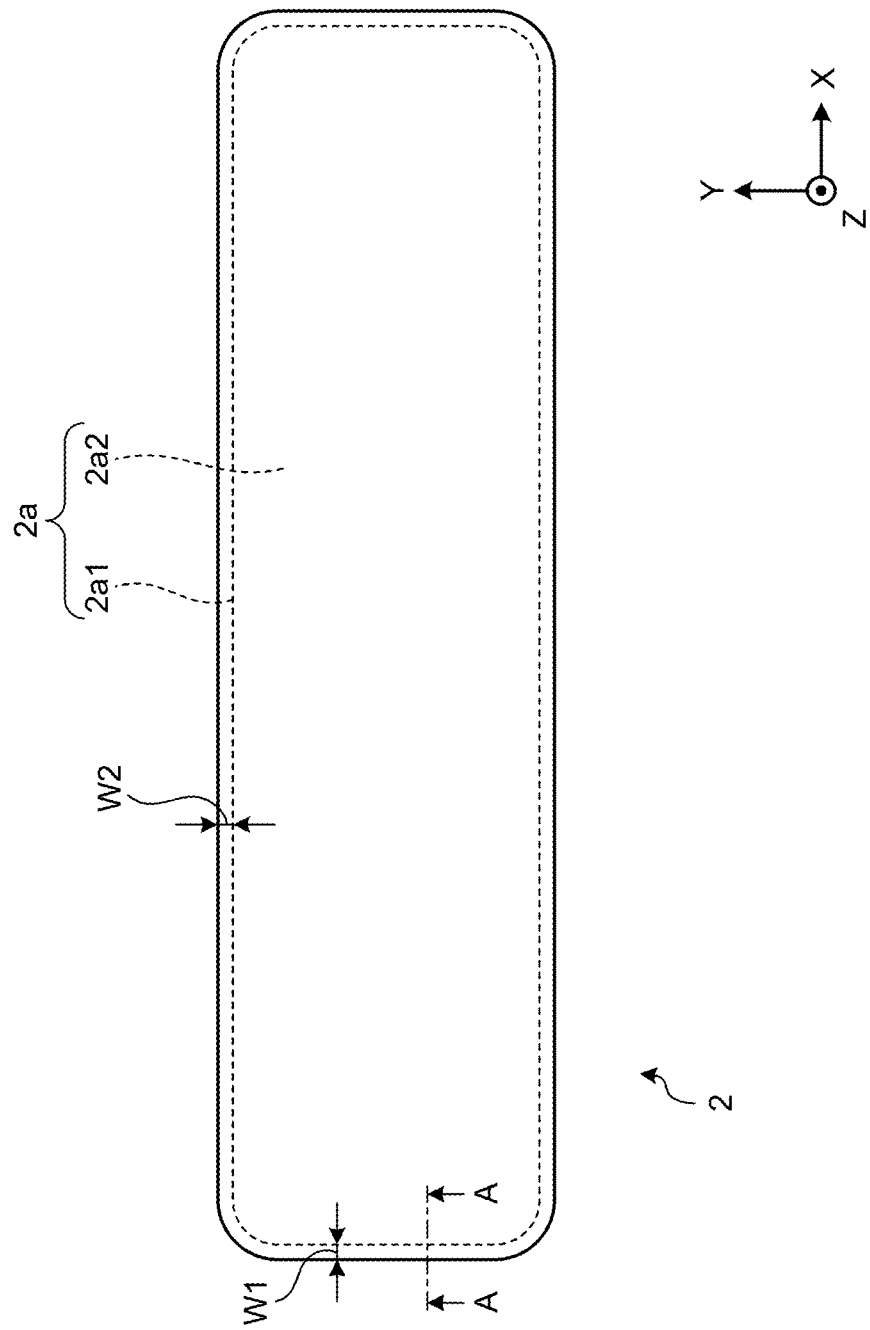
FIG. 2 is a front view illustrating an example of a configuration of a display apparatus according to an embodiment.

The display apparatus 2 is as illustrated in FIG. 2 when viewed from the front surface 2a side. FIG. 2 is a front view illustrating an example of a configuration of the display apparatus 2 according to the embodiment. Hereinafter, a direction perpendicular to the front surface 2a is defined as a Z direction, and two directions orthogonal to each other in the front surface 2a are defined as an X direction and a Y direction.

The front surface 2a has, for example, a rectangular shape with rounded corners in the XY plane view. The front surface 2a has a frame region 2a1 and a display region 2a2. The frame region 2a1 is a portion serving as an edge on the front surface 2a. The display region 2a2 is a portion inside the frame region 2a1 on the front surface 2a.

In the display mode, the display apparatus 2 displays an image in the display region 2a2 on the front surface 2a. In the mirror mode, the display apparatus 2 causes the display region 2a2 on the front surface 2a to function as a mirror in the mirror mode.

The display apparatus 2 may have a function of a variable reflectance mirror (VRM). In a case where the display apparatus 2 has the VRM function, the reflectance of the display region 2a2 may be varied with the illuminance or the like in the vicinity of the front surface 2a in the mirror mode. For example, in the mirror mode, in a case where the illuminance near the front surface 2a is less than a predetermined value, the display apparatus 2 may maintain the reflectance of the display region 2a2 at RR1. In a case where the illuminance near the front surface 2a is equal to or higher than the predetermined luminance, the display apparatus 2 may decrease the reflectance of the display region 2a2 to RR2 (<RR1).

The case where the illuminance in the vicinity of the front surface 2a is equal to or higher than the predetermined luminance refers to, for example, a case where the headlight of the following vehicle is reflected at equal to or higher than the predetermined luminance or a case where sunlight is reflected at equal to or higher than the predetermined luminance in the rear image. In such a case, the display apparatus 2 can implement the automatic anti-glare by the VRM in the mirror mode. In addition, the display apparatus 2 may lower the reflectance of the display region 2a2 to RR3 (<<RR2) in the display mode. As a result, in the display mode, when an image of an electro-optical member 27 (see FIG. 3) is transmitted through the front surface 2a and displayed, the display apparatus 2 can allow the user to easily view the image.

On the front surface 2a, the frame region 2a1 has substantially a width W1 at a portion extending in the Y direction, and substantially a width W2 at a portion extending in the X direction. The width W1 and the width W2 may be equal or different.

Figure 3:
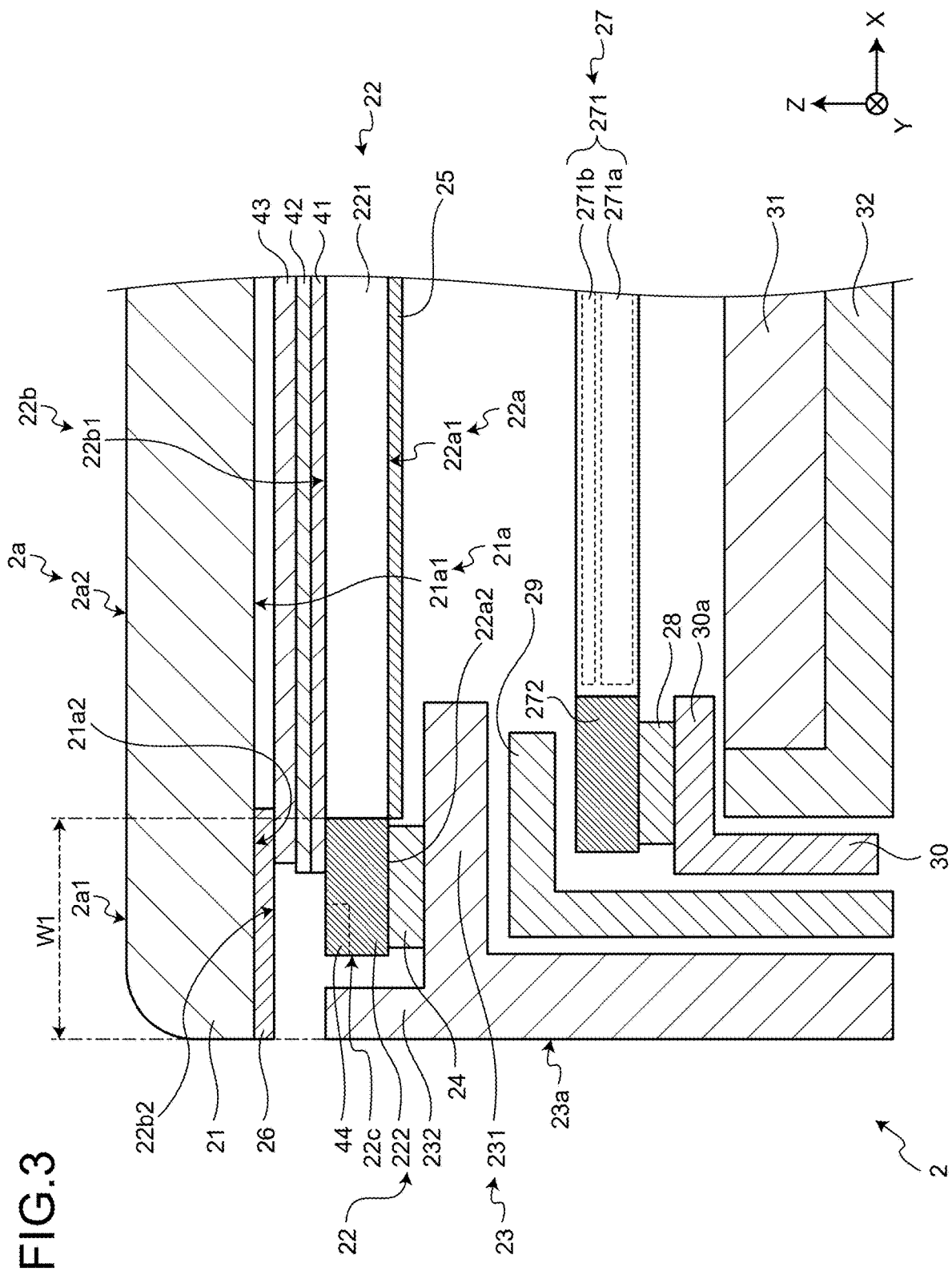
FIG. 3 is a cross-sectional view illustrating an example of a configuration of a display apparatus according to an embodiment.

In the display apparatus 2, as illustrated in FIG. 3, a transmissive member 26 is provided. The light transmittance of the transmissive member 26 is set to 5% or more. With this configuration, the width of the contour existing at the boundary between the frame region 2a1 and the display region 2a2 on the front surface 2a can be reduced.

FIG. 3 is an XZ cross-sectional view illustrating an example of a configuration of the display apparatus 2 according to the embodiment. FIG. 3 illustrates an XZ cross section taken along line A-A in FIG. 2. In FIG. 3, the structure of the XZ cross section corresponding to the portion extending in the Y direction of the frame region 2a1 is illustrated. However, the concept of the present embodiment is similarly applicable to the structure of the YZ cross section corresponding to the portion extending in the X direction of the frame region 2a1.

In the example illustrated in FIG. 3, the display apparatus 2 includes an optical member 21, an electro-optical member 22, a housing 23, an adhesive layer 24, a half mirror film 25, a transmissive member 26, an electro-optical member 27, an adhesive layer 28, a frame member 29, a frame member 30, an optical member 31, and a case 32. The above-mentioned VRM function is mainly implemented by the electro-optical member 22 and the half mirror film 25.

The optical member 21 extends in a plate shape in the XY directions and has a substantially rectangular shape with the X direction as a longitudinal direction. The optical member 21 has light-transmitting properties (namely, translucency). The optical member 21 may be formed of inorganic glass containing $SiO_2$, or may be formed of organic glass containing a transparent resin such as polymethyl methacrylate resin (PMMA) or polycarbonate (PC). The optical member 21 is also called a cover panel, and can protect the display apparatus 2 from an external impact or the like.

The optical member 21 has the front surface 2a on the +Z side and a back surface 21a on the −Z side. The front surface 2a has the frame region 2a1 and the display region 2a2. The frame region 2a1 is an edge portion of the front surface 2a, and extends in a stripe shape in the Y direction or the X direction along an outer contour of the front surface 2a (see FIG. 2). The display region 2a2 flatly extends in the XY directions inside the frame region 2a1.

The back surface 21a has a first region 21a1 and a second region 21a2. The second region 21a2 is located outside the first region 21a1 in the XY directions. The first region 21a1 corresponds to the display region 2a2 and overlaps with the display region 2a2 when viewed from the Z direction. The second region 21a2 corresponds to the frame region 2a1 and overlaps with the frame region 2a1 when viewed from the Z direction.

Figures 4, 5, 6:
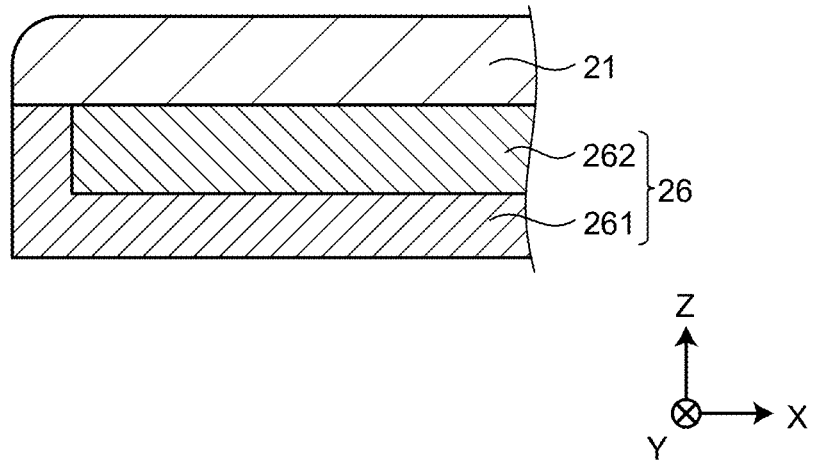
FIG. 4 is a cross-sectional view illustrating an example of a configuration of a deposited layer according to an embodiment.
FIG. 5 is a table for describing transmittance of a deposited layer according to an embodiment.
FIG. 6 is a table illustrating an example of a relationship between transmittance and appearance of a deposited layer according to an embodiment.

The transmissive member 26 is a transmissive member that is provided on a peripheral edge of the back surface 21a of the optical member 21, which lies behind the front surface 2a corresponding to the observation side. The transmissive member 26 has a transmittance of 5% or more. In one example, the transmissive member 26 is printed or bonded to the back surface 21a of the optical member 21. In one example, the transmissive member 26 is provided in the second region 21a2. Additionally, the transmissive member 26 is formed by sequentially laminating an insulating film layer and a metal film layer on the back surface 21a of the optical member 21. The insulating film layer covers the end portion of the metal film layer. The insulating film layer and the metal film layer may be formed by vapor deposition. The layer structure of the transmissive member 26 will be described with reference to FIG. 4. FIG. 4 is a schematic diagram illustrating an example of the transmissive member 26 according to the embodiment.

In the present embodiment, the transmissive member 26 is constituted by an insulating film layer and a metal film layer. The insulating film layer is, for example, a silicon dioxide film layer 261 formed of silicon dioxide. The metal film layer is, for example, a chromium film layer 262 formed of chromium. The silicon dioxide film layer 261 covers the end portion of the chromium film layer 262 and contacts the end portion of the optical member 21. The chromium film layer 262 is provided between the optical member 21 and the silicon dioxide film layer 261.

The film thickness of the silicon dioxide film layer 261 in the present embodiment is configured to be in a range of 130 nm to 600 nm, inclusive. The film thickness of the silicon dioxide film layer 261 can be set based on the electrostatic protection performance of the display apparatus 2 and the degree of influence on the appearance hue.

When the film thickness of the silicon dioxide film layer 261 is 130 nm or more, the silicon dioxide film layer 261 covers the side surface of the metal film such as the chromium film layer 262. With this configuration, it is possible to sufficiently suppress electricity from flowing through the metal film when the display apparatus 2 receives static electricity.

Therefore, it is possible to reduce the possibility that the electricity flowing in the metal film flows to the electro-optical member 22 and the electro-optical member 27 and thereby a trouble is caused in the electro-optical member 22 and the electro-optical member 27. As a result, the withstand voltage of the display apparatus 2 can be improved.

In addition, by covering the side surface of the metal film such as the chromium film layer 262 with the silicon dioxide film layer 261, it is possible to sufficiently suppress electricity from flowing through the metal film when the display apparatus 2 receives static electricity.

Moreover, in the display apparatus 2, by setting the film thickness of the silicon dioxide film layer 261 to 600 nm or less, it is possible to suppress the influence of the hue of the silicon dioxide film layer 261 on the appearance of the image or the mirror image displayed on the display apparatus 2.

Next, the light transmittance of the transmissive member 26 will be described with reference to FIG. 5. FIG. 5 is a table for describing the film thickness and transmittance of the transmissive member 26 according to the embodiment. FIG. 5 is a table T1 illustrating the thickness and transmittance of the chromium film layer 262 in a case where the transmissive member 26 according to the embodiment is constituted by the chromium film layer 262.

As illustrated in FIG. 5, in a case where the film thickness of the chromium film layer 262 is set to 20 nm, the light transmittance is 15.6%. In a case where the film thickness of the chromium film layer 262 is set to 25 nm, the light transmittance is 11.1%. In a case where the film thickness of the chromium film layer 262 is set to 30 nm, the light transmittance is 8.0%. In a case where the film thickness of the chromium film layer 262 is set to 35 nm, the light transmittance is 5.8%.

Therefore, by setting the film thickness of the chromium film layer 262 to 35 nm or less, the transmissive member 26 having a transmittance of 5% or more can be realized. The film thickness of the chromium film layer 262 may be set to 20 nm or more. With this configuration, the transmittance of the transmissive member 26 can be 16% or less, and a member provided behind the transmissive member 26 can be made difficult to be visually recognized by the user.

Returning to FIG. 3, the transmissive member 26 is disposed between the optical member 21 and the electro-optical member 22 in the Z direction. The transmissive member 26 is disposed between the second region 21a2 and the electro-optical member 22 in the Z direction. The end portion of the transmissive member 26 is disposed between the end portion of the optical member 21 and a protruding portion 231 of the housing 23 described later.

The transmissive member 26 has a substantially rectangular outer contour whose longitudinal direction is the X direction. The transmissive member 26 has an opening corresponding to the display region 2a2. The transmissive member 26 contacts the back surface 21a of the optical member 21 on the +Z side and covers the second region 21a2. The transmissive member 26 covers the +Z-side surface of the electro-optical member 22.

The electro-optical member 22 is provided on the back surface side (−Z side) of the optical member 21. The electro-optical member 22 is provided on the back surface side (−Z side) of the transmissive member 26. The optical characteristics of the electro-optical member 22 can vary with the applied voltage. The electro-optical member 22 has a liquid crystal region 221 and a peripheral region 222. A boundary between the liquid crystal region 221 and the peripheral region 222 in the electro-optical member 22 defines a boundary between the display region 2a2 and the frame region 2a1 on the front surface 2a. The peripheral region 222 may be bonded to the back surface of the transmissive member 26 with a transparent adhesive such as optically clear adhesive (OCA).

The electro-optical member 22 has a front surface 22b (an example of the first surface) on the +Z side and a back surface 22a (an example of the second surface) on the −Z side. The front surface 22b has a region 22b1 and a region 22b2. The region 22b2 is located outside the region 22b1 in the XY directions. The region 22b1 corresponds to the display region 2a2 and overlaps with the display region 2a2 when viewed from the Z direction. The region 22b2 corresponds to the frame region 2a1 and overlaps with the frame region 2a1 when viewed from the Z direction.

The back surface 22a has a region 22a1 and a region 22a2. The region 22a2 is located outside the region 22a1 in the XY directions. The region 22a2 corresponds to the frame region 2a1 and overlaps with the frame region 2a1 when viewed from the Z direction. The region 22a1 corresponds to the display region 2a2 and overlaps with the display region 2a2 when viewed from the Z direction.

The transmissive member 26 covers the region 22b2. The region 22b2 corresponds to the peripheral region 222 of the electro-optical member 22. By setting the transmittance of the transmissive member 26 to a predetermined value or less, the transmissive member 26 can shield elements, wirings, terminals, and the like disposed in the peripheral region 222 of the electro-optical member 22. As a result, elements, wiring, terminals, and the like disposed in the peripheral region 222 of the electro-optical member 22 are less likely to be visually recognized by the user, so that the appearance of the display apparatus 2 can be improved.

A polarizing plate 41, an adhesive member 42, and a PET film 43 formed of a resin material are sequentially laminated on the front surface 22b of the electro-optical member 22, which faces the optical member 21.

The polarizing plate 41 extends in the XY directions. The polarizing plate 41 is provided on the back surface side (−Z side) of the optical member 21. The polarizing plate 41 is provided on the back surface side (−Z side) of the adhesive member 42. The polarizing plate 41 is provided between the electro-optical member 22 and the PET film 43. The polarizing plate 41 is bonded to the electro-optical member 22 by an adhesive layer (not illustrated). The adhesive layer includes, for example, a transparent adhesive such as OCA.

The adhesive member 42 extends in the XY directions. The adhesive member 42 is provided on the back surface side (−Z side) of the optical member 21. The adhesive member 42 is provided on the back surface side (−Z side) of the PET film 43. The adhesive member 42 serves to bond the polarizing plate 41 and the PET film 43 together.

The PET film 43 is a sheet member formed of a resin material containing PolyEthylene Terephthalate. The PET film 43 is an example of the retardation film in the present disclosure. The PET film 43 has a retardation value that is in a range of 2000 nm to 4000 nm, inclusive. The retardation value refers to a value representing the magnitude of the phase difference between the polarized component along the fast axis and the polarized component along the slow axis of the PET film 43.

For instance, a retardation value of 2000 nm represents that a phase difference of 2000 nm exists between the polarized component along the fast axis and the polarized component along the slow axis. The PET film 43 is, for example, 100 μm.

The PET film 43 extends in the XY directions. The PET film 43 is provided on the back surface side (−Z side) of the optical member 21. The PET film 43 is bonded to the back surface 21a of the optical member 21 and the transmissive member 26 by an adhesive layer (not illustrated). The adhesive layer includes, for example, a transparent adhesive such as OCA.

The liquid crystal region 221 corresponds to the display region 2a2 and extends in the XY directions. The liquid crystal region 221 is, for example, a TN system liquid crystal panel. The liquid crystal panel has a configuration in which a TN type liquid crystal material is sealed between a pair of transparent substrates 44 being spaced from each other in the Z direction and extending in the XY directions.

The peripheral region 222 corresponds to the frame region 2a1 and extends so as to surround the periphery of the liquid crystal region 221 in the XY plane view. In the peripheral region 222, the end portions of the pair of transparent substrates 44 are disposed, and a member for sealing the liquid crystal material is disposed. Of the pair of transparent substrates 44, the +Z-side surface of the end portion of the +Z-side transparent substrate 44 may be bonded to the back surface of the transmissive member 26 with a transparent adhesive such as OCA. The −Z-side surface of the end portion of the −Z-side transparent substrate 44 may be bonded to the housing 23 with a transparent adhesive such as OCA. A transparent electrode formed of a transparent conductive material such as indium tin oxide (ITO) can be disposed on each of the pair of transparent substrates 44.

Additionally, a control circuit or the like connected to the pair of transparent electrodes may be provided in the peripheral region 222. The control circuit can change the alignment state of the liquid crystal molecules by changing the voltage applied to the pair of transparent electrodes, thereby changing the optical characteristics (for example, transmittance and reflectance) of the electro-optical member 22. The VRM function is mainly implemented by change in optical characteristics of the electro-optical member 22 and an operation of light reflection and transmission by the half mirror film 25 according to the change.

The housing 23 is provided on the back surface side (−Z side) of the optical member 21 and is provided outside the electro-optical member 22 in the XY directions. The housing 23 has the protruding portion 231 and a side wall portion 232. The protruding portion 231 protrudes from the side wall portion 232 in a direction along the back surface 22a of the electro-optical member 22. The protruding portion 231 extends along the back surface 22a of the electro-optical member 22. The protruding portion 231 covers the end portion of the electro-optical member 27 and protrudes toward the back surface of the optical member 21. The side wall portion 232 covers an XY direction end surface 22c of the electro-optical member 22 from the outside in the XY directions on the outside in the XY directions of the electro-optical member 22. The side wall portion 232 extends in the YZ directions or the ZX directions (see FIG. 2) and forms an outer surface 23a of the housing 23. The housing 23 can be formed of a material having light shielding properties.

The adhesive layer 24 is provided between the back surface 22a of the electro-optical member 22 and the protruding portion 231. The adhesive layer 24 may be a member in which an adhesive is applied to a +Z-side surface and a −Z-side surface of a double-sided tape or the like. The adhesive layer 24 is provided between the region 22a2 and the protruding portion 231 to bond the peripheral region 222 of the electro-optical member 22 to the protruding portion 231.

Thus, the optical member 21 is bonded to the electro-optical member 22 via a transparent adhesive such as OCA, the PET film 43, etc. The adhesive layer 24 bonds the back surface 22a of the electro-optical member 22 to the housing 23. As a result, the optical member 21 is fixed to the housing 23 via the electro-optical member 22. Therefore, in the display apparatus 2, the width of the adhesive layer 24 in the X direction can be secured according to the width of the peripheral region 222 in the X direction, and the bonding area of the adhesive layer 24 can be secured wide, so that the bonding strength (for example, vibration resistance robustness) can be easily secured.

The adhesive layer 24 is provided between the back surface 22a of the electro-optical member 22 and the protruding portion 231 to fix the optical member 21 to the housing 23 via the electro-optical member 22. With this configuration, the width in the X direction of the adhesive layer 24 can be secured according to the width in the X direction of the peripheral region 222 while an X-direction end portion 22ci of the electro-optical member 22 is positioned on the more outer side in the X direction. In short, the X-direction end portion 22ci of the electro-optical member 22 can be brought close to the outer surface 23a of the housing 23. Accordingly, the boundary between the liquid crystal region 221 and the peripheral region 222 in the electro-optical member 22 can be located further outside in the X direction.

The half mirror film 25 is provided between the electro-optical member 22 and the electro-optical member 27 in the Z direction. The transmissive member 26 is disposed between the region 22a1 and the electro-optical member 27 in the Z direction. The half mirror film 25 has a substantially rectangular shape whose longitudinal direction is the X direction corresponding to the display region 2a2 (see FIG. 2). The half mirror film 25 contacts the back surface 22a of the electro-optical member 22 on the +Z side and covers the region 22a1. The half mirror film 25 may be bonded to the back surface 22a of the electro-optical member 22 with a transparent adhesive such as OCA. The half mirror film 25 is separated from the electro-optical member 27 on the −Z side. The half mirror film 25 may be a polarization reflection layer.

In a case where the display apparatus 2 is observed from the +Z side in the mirror mode, the frame region 2a1 looks similar in color to the transmissive member 26, and the display region 2a2 looks similar in color to the half mirror film 25. At this time, as indicated by a dotted line in FIG. 2, a black line may be visually recognized at the boundary between the frame region 2a1 and the display region 2a2.

The black line is considered to occur as follows. Part of the light incident from the +Z side of the front surface 2a is reflected by the surface of the half mirror film 25 and is directed to the back surface of the transmissive member 26. It is considered that a black line is generated by the light being shielded by the transmissive member 26 and visually recognized as a shadow of the transmissive member 26. The width of the visually recognized black line may be about twice the width of the region where the reflected light of the half mirror film 25 may be shielded by the transmissive member 26. In other words, when the region where the reflected light of the half mirror film 25 is shielded by the transmissive member 26 increases, the black line is easily noticeable. Since the transmissive member 26 of the present embodiment has a transmittance of 5% or more, it is difficult to shield reflected light of the half mirror film 25. As a result, the black line width can be suppressed, so that the black line can be made less noticeable.

The frame member 29 is provided between the housing 23 and the electro-optical member 27 in the XY directions. The frame member 29 extends along the YZ directions or the ZX directions. The frame member 29 is bent inward in the XY directions such that an end portion on the +Z side covers the electro-optical member 27 from the +Z side. The frame member 29 may be formed of material, such as metal, that can be processed into a sheet-metal. The frame member 29 may be fixed to the housing 23.

The electro-optical member 27 is disposed on the back surface 22a side (−Z side) of the electro-optical member 22. The electro-optical member 27 is disposed between the electro-optical member 22 and the optical member 31 in the Z direction. The electro-optical member 27 is disposed between the frame member 29 and the frame member 30 in the Z direction. The optical characteristics of the electro-optical member 27 can be changed by applying voltage. The electro-optical member 27 has a liquid crystal region 271 and a peripheral region 272. The electro-optical member 27 may be, for example, a display panel for image display.

The liquid crystal region 271 corresponds to the display region 2a2 and extends in the XY directions. The liquid crystal region 271 includes, for example, a TFT system liquid crystal panel 271a and a polarizing plate 271b provided on the +Z side thereof. The liquid crystal panel 271a has a configuration in which a TFT type liquid crystal material is sealed between a pair of transparent substrates being separated from each other in the Z direction and extending in the XY directions. The liquid crystal region 271 may further include a polarizing plate provided on the −Z side of the liquid crystal panel 271a.

The peripheral region 272 corresponds to the frame region 2a1 and extends so as to surround the periphery of the liquid crystal region 271 in the XY plane view. In the peripheral region 272, end portions of the pair of transparent substrates are disposed, and a member for sealing the liquid crystal material is provided. Of the pair of transparent substrates, a −Z-side surface of an end portion of the −Z-side transparent substrate may be bonded to the frame member 30 with a transparent adhesive such as OCA. A transparent electrode formed of a transparent conductive material such as ITO can be provided on each of the pair of transparent substrates.

Additionally, a control circuit or the like connected to the pair of transparent electrodes may be provided in the peripheral region 272. The control circuit can change the alignment state of the liquid crystal molecules by changing the voltage applied to the pair of transparent electrodes, thereby changing the optical characteristics (for example, transmittance) of the electro-optical member 27. The image display function is mainly implemented by a change in optical characteristics of the electro-optical member 27.

The frame member 30 is provided between the frame member 29, and the case 32 and the optical member 31 in the XY directions. The frame member 30 extends along the YZ directions or the ZX directions. The frame member 30 has a bent portion 30a bent inward in the XY directions such that an end portion on the +Z side covers the case 32 and the optical member 31 from the +Z side. As described above, the frame member 29 may be formed of material, such as metal, that can be processed into a sheet-metal. The frame member 30 may be fixed to the housing 23 directly or via the frame member 29.

The adhesive layer 28 is provided between the back surface of the electro-optical member 27 and the bent portion 30a of the frame member 30. The adhesive layer 28 may be a member in which an adhesive is applied to a +Z-side surface and a −Z-side surface of a double-sided tape or the like. The adhesive layer 28 is provided between an outer region on the back surface of the electro-optical member 27 and the bent portion 30a of the frame member 30, and bonds the peripheral region 272 of the electro-optical member 27 to the bent portion 30a of the frame member 30.

Thus, the adhesive layer 28 bonds the back surface of the electro-optical member 27 to the frame member 30. Thus, the electro-optical member 27 is fixed to the housing 23 via the frame member 30. As a result, the width in the X direction of the adhesive layer 28 can be secured according to the width in the X direction of the peripheral region 272 while the X-direction end portion 22ci of the electro-optical member 27 is located relatively outside in the X direction. As a result, it is possible to secure a wide bonding area of the adhesive layer 28 while securing a wide display region, so that it is possible to easily secure the bonding strength.

The optical member 31 is provided on the back surface side (−Z side) of the electro-optical member 27. The optical member 31 extends in a plate shape in the XY directions and has a substantially rectangular shape whose longitudinal direction corresponds to the X direction. The optical member 31 is configured to illuminate the electro-optical member 27 from the back surface side. The optical member 31 is, for example, a backlight element.

The case 32 is provided on the back surface side (−Z side) of the electro-optical member 27 and is provided on the −Z side of the optical member 31. The case 32 has a box shape with the +X side open, and can accommodate the optical member 31. The case 32 may be fixed to the housing 23 directly or via the frame member 30 and/or the frame member 29.

Next, appearance of the transmissive member 26 and the display apparatus 2 according to the present embodiment will be described. FIG. 6 is a table illustrating an example of a relationship between transmittance and appearance of the transmissive member 26 according to the embodiment. Note that the appearance is represented by determination as to whether or not the inside of the display apparatus 2 is seen through and is visually recognized by the user, and whether or not the contour of the boundary between the frame region 2a1 and the display region 2a2 is visually recognized by the user in black. In FIG. 6, contents of evaluation on the appearance are illustrated, which are obtained for the transmittance of the transmissive member 26 being 5%, 10%, 15%, and 20%.

In the table T2 illustrated in FIG. 6, the items of appearance are "visibility of structures", "visibility of the electro-optical member", and "contour of the boundary". The item of "visibility of structures" indicates whether or not the structures inside the display apparatus 2 are seen through and visually recognized by the user in a case where the display apparatus 2 is observed from the surface. The item of "visibility of the electro-optical member" indicates whether or not the electro-optical member 22 inside the display apparatus 2 is seen through and visually recognized by the user. The item of "contour of the boundary" indicates whether or not the contour of the boundary between the frame region 2a1 and the display region 2a2 is visually recognized by the user. Here, the structure is the transparent substrate 44. Note that the item of appearance is not limited thereto.

In addition, in FIG. 6, a double circular symbol, a single circular symbol, and a triangular symbol are illustrated as the evaluation results. The double circular symbol represents that, as a result of the evaluation, the display apparatus 2 is in a good state even in a case where the display apparatus 2 is used in an external environment of the vehicle 5 or the display apparatus 2 is irradiated with light stronger than light irradiated in a case of normal use in the vehicle 5, for example. Here, the good state refers to a state in which the user cannot visually recognize the structures inside the display apparatus 2, the electro-optical member 22, and the contour of the boundary between the frame region 2a1 and the display region 2a2.

The single circular symbol represents that, as a result of the evaluation, the display apparatus 2 is in a good state in any environment in a case of being used in the vehicle 5, for example. The triangular symbol represents that, as a result of the evaluation, for example, in a case of being used in the vehicle 5, the target object can be visually recognized by the user in some environments although it is good in a normal environment. Some environments are, for example, a case where the display apparatus 2 receives the setting sun. The target object is, for example, structures inside the display apparatus 2, the electro-optical member 22, and the contour of the boundary between the frame region 2a1 and the display region 2a2.

Therefore, as illustrated in FIG. 6, by setting the transmittance of the transmissive member 26 to 5% or more, more specifically, to be in a range of 5% to 20%, inclusive, it is possible to reduce visibility (or transparency) of the structures or the electro-optical member 22 and the contour of the boundary between the frame region 2a1 and the display region 2a2.

The transmittance of the transmissive member 26 may be set to 10% or more. With this configuration, the contour of the boundary between the frame region 2a1 and the display region 2a2 can be made more difficult to be visually recognized by the user. Moreover, the transmittance of the transmissive member 26 may be set to 15% or less. With this configuration, the electro-optical member 22 can be made more difficult to be visually recognized by the user.

As described above, the embodiment includes the optical member 21 with translucency, the transmissive member 26, the electro-optical member 22, and the housing 23. The optical member 21 includes the front surface 2a corresponding to an observation side and the back surface 21a lying behind the front surface 2a. The transmissive member 26 is provided on the peripheral edge of the back surface 21a of the optical member 21. The transmissive member has a transmittance of 5% or more. The electro-optical member 22 is provided on a side of the back surface 21a of the optical member 21. The electro-optical member 22 has optical characteristics that vary with applied voltage. The housing 23 includes the protruding portion 231. The protruding portion 231 covers the end portion of the electro-optical member 22 and protrudes toward the back surface 21a of the optical member 21. The end portion of the transmissive member 26 is located between the end portion of the optical member 21 and the protruding portion 231. Consequently, the contour of the boundary between the frame region 2a1 and the display region 2a2 can be reduced.

Note that, in the description of the present disclosure, components having the same or substantially the same functions as those described above with respect to the previously described drawings are denoted by the same reference signs, and the description thereof may be appropriately omitted. In addition, even in the case of representing the same or substantially the same portion, the dimensions and ratios may be represented differently from each other depending on the drawings. Furthermore, for example, from the viewpoint of ensuring the visibility of the drawings, in the description of each drawing, only main components are denoted by reference signs, and even components having the same or substantially the same functions as those described above in the previous drawings may not be denoted by reference signs.

First Modification

Figure 7:
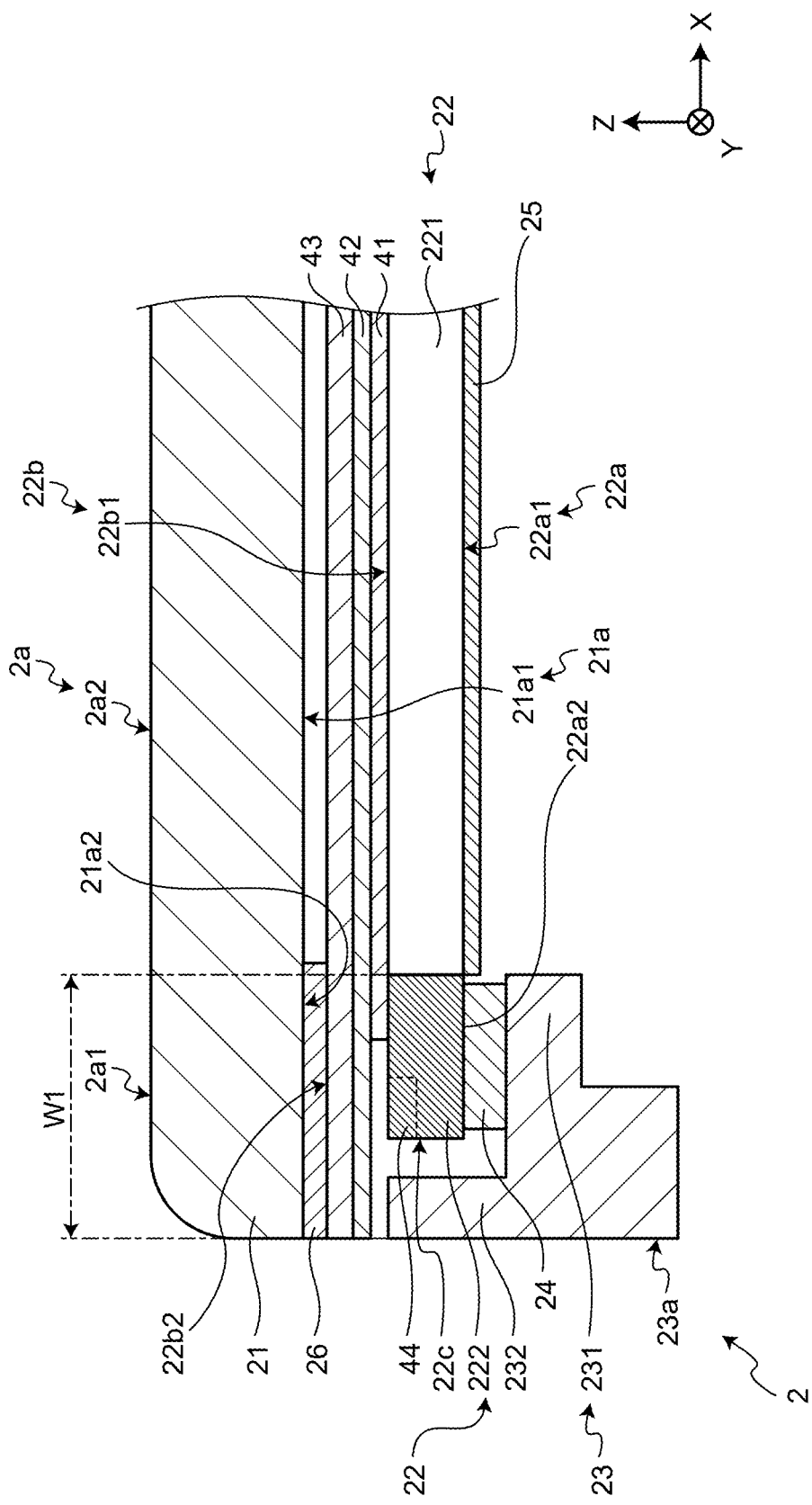
FIG. 7 is a cross-sectional view illustrating an example of a configuration of a display apparatus according to a first modification.

In the above-described embodiment, the end portion of the transmissive member 26 is provided between the end portion of the optical member 21 and the protruding portion 231. However, the present invention is not limited thereto. For example, the end portion of the PET film 43 may be disposed between the end portion of the transmissive member 26 and the protruding portion 231. FIG. 7 is a cross-sectional view illustrating an example of a configuration of a display apparatus 2 according to a first modification.

Comparing FIG. 7 with FIG. 3, the adhesive member 42 and the PET film 43 illustrated in FIG. 7 extend in the negative direction of the X axis, and the end portion of the PET film 43 is disposed between the end portion of the transmissive member 26 and the protruding portion 231. With this configuration illustrated in FIG. 7, the contour of the boundary between the frame region 2a1 and the display region 2a2 can be reduced.

Second Modification

In the first modification described above, the end portion of the PET film 43 is disposed between the end portion of the transmissive member 26 and the protruding portion 231. However, the present invention is not limited thereto. For example, the end portion of the polarizing plate 41 may be disposed between the end portion of the PET film 43 and the protruding portion 231. FIG. 8 is a cross-sectional view illustrating an example of a configuration of a display apparatus 2 according to a second modification.

Comparing FIG. 8 with FIG. 7, the polarizing plate 41 in FIG. 8 extends in the negative direction of the X axis, and the end portion of the polarizing plate 41 is disposed between the end portion of the PET film 43 and the protruding portion 231. With this configuration illustrated in FIG. 8, the contour of the boundary between the frame region 2a1 and the display region 2a2 can be reduced.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display apparatus comprising:
an optical member with translucency, the optical member including a front surface corresponding to an observation side and a back surface lying behind the front surface;
a transmissive member provided on a peripheral edge of the back surface of the optical member, the transmissive member having a transmittance of 5% or more;
an electro-optical member provided on a side of the back surface of the optical member, the electro-optical member having optical characteristics varying with applied voltage; and
a housing including a protruding portion, the protruding portion covering an end portion of the electro-optical member and protruding toward the back surface of the optical member,
wherein an end portion of the transmissive member is located between an end portion of the optical member and the protruding portion.

2. The display apparatus according to claim 1, wherein the electro-optical member includes a first surface facing the optical member and a second surface lying behind the first surface,
a polarizing plate is provided on the first surface of the electro-optical member, and
a retardation film with a resin material is provided on the polarizing plate.

3. The display apparatus according to claim 2, wherein an end portion of the retardation film is located between the end portion of the transmissive member and the protruding portion.

4. The display apparatus according to claim 3, wherein an end portion of the polarizing plate is located between the end portion of the retardation film and the protruding portion.

5. The display apparatus according to claim 4, wherein
the transmissive member includes an insulating film layer and a metal film layer that are laminated on the back surface of the optical member, and
the insulating film layer covers an end portion of the metal film layer.

6. The display apparatus according to claim 5, wherein
a film thickness of the metal film layer is in a range of 20 nm to 35 nm, inclusive, and
a film thickness of the insulating film layer is in a range of 130 nm to 600 nm, inclusive.

7. The display apparatus according to claim 2, wherein
the transmissive member includes an insulating film layer and a metal film layer that are laminated on the back surface of the optical member, and
the insulating film layer covers an end portion of the metal film layer.

8. The display apparatus according to claim 7, wherein
a film thickness of the metal film layer is in a range of 20 nm to 35 nm, inclusive, and
a film thickness of the insulating film layer is in a range of 130 nm to 600 nm, inclusive.

9. The display apparatus according to claim 2, wherein the transmittance of the transmissive member is in a range of 5% to 20%, inclusive.

10. The display apparatus according to claim 3, wherein
the transmissive member includes an insulating film layer and a metal film layer that are laminated on the back surface of the optical member, and
the insulating film layer covers an end portion of the metal film layer.

11. The display apparatus according to claim 10, wherein
a film thickness of the metal film layer is in a range of 20 nm to 35 nm, inclusive, and
a film thickness of the insulating film layer is in a range of 130 nm to 600 nm, inclusive.

12. The display apparatus according to claim 3, wherein the transmittance of the transmissive member is in a range of 5% to 20%, inclusive.

13. The display apparatus according to claim 4, wherein the transmittance of the transmissive member is in a range of 5% to 20%, inclusive.

14. The display apparatus according to claim 1, wherein
the transmissive member includes an insulating film layer and a metal film layer that are laminated on the back surface of the optical member, and
the insulating film layer covers an end portion of the metal film layer.

15. The display apparatus according to claim 14, wherein
a film thickness of the metal film layer is in a range of 20 nm to 35 nm, inclusive, and
a film thickness of the insulating film layer is in a range of 130 nm to 600 nm, inclusive.

16. The display apparatus according to claim 14, wherein the transmittance of the transmissive member is in a range of 5% to 20%, inclusive.

17. The display apparatus according to claim 1, wherein the transmittance of the transmissive member is in a range of 5% to 20%, inclusive.

* * * * *